United States Patent Office 3,657,438
Patented Apr. 18, 1972

3,657,438
COMPOSITIONS AND METHODS FOR TREATING INFLAMMATION

Herbert Morton Blatter, Springfield, and Robert Armistead Lucas, Mendham, N.J., assignors to Ciba Corporation, Summit, N.J.
No Drawing. Filed Sept. 27, 1968, Ser. No. 763,410
Int. Cl. A61k 27/00
U.S. Cl. 424—248                 5 Claims

ABSTRACT OF THE DISCLOSURE 5-aminoaliphatyl - cycloalkano[c]pyrazoles, e.g. those of the formula

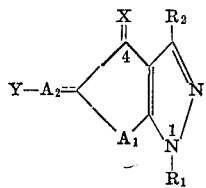

$R_{1,2}$=H, alkyl, aralkyl or aryl
$A_1$=alkylene
$A_2$=alkylidene or alkylidyne
X=$H_2$,HOH or O
Y=an amino group 2-$R_1$-isomers, acyl derivatives, quaternaries and salts thereof exhibit antiinflammatory and antiarrhythmic effects.

SUMMARY OF THE INVENTION

The present invention concerns and has for its object the provision of new 5-aminoaliphatyl-cycloalkano[c]pyrazoles, more particularly those of the Formulae I and II

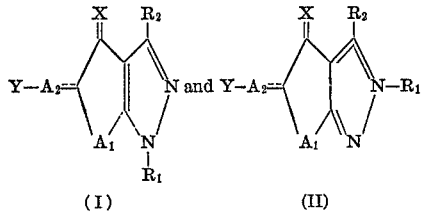

in which each of $R_1$ and $R_2$ is hydrogen, lower alkyl, iso- or heterocyclic aralkyl or aryl, $A_1$ is lower alkylene separating the adjacent carbon atoms by 1–3 carbon atoms, $A_2$ is lower alkylidene or alkylidyne, X represents 2 hydrogens, hydrogen and hydroxy or oxo, and Y is an amino group, of acyl derivatives, quaternaries and salts thereof, of corresponding pharmaceutical compositions and of methods for the preparation and application of these products. Said compositions are useful analgesic, tranquilizing, antiarrhythmic and antiinflammatory agents.

DESCRIPTION OF THE PREFERRED EMBODIMENTS

A lower alkyl group $R_1$ and/or $R_2$ is preferably methyl, ethyl, n- or i-propyl, or -butyl, but also, for example, straight or branched pentyl, hexyl or heptyl. The term "lower" referred to above and hereinafter in connection with organic radicals or compounds respectively, defines such with up to 7, preferably up to 4 carbon atoms.

The aralkyl or aryl radical $R_1$ and/or $R_2$ is preferably a monocyclic isocyclic or monoaza-, oxa- or thiacyclic aryl-lower alkyl or aryl radical. It is unsubstituted or substituted by one or more than one, preferably by 1 or 2, of the same or of different substituents, for example, by lower alkyl, such as methyl, ethyl, n- or i-propyl or -butyl, free, etherified or esterified hydroxy or mercapto groups, such as lower alkoxy or alkylmercapto, e.g. methoxy, ethoxy, n- or i-propoxy or -butoxy, halogen, e.g. fluoro, chloro or bromo, trifluoromethyl, nitro or amino, especially di-lower alkylamino, e.g. dimethylamino or diethylamino. Preferred aralkyl or aryl radicals are represented by Ar-lower alkyl or Ar, wherein Ar stands for phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl.

The lower alkylene radical $A_1$ preferably represents methylene, 1,1- or 1,2-ethylene, 1,1-, 1,2-, 1,3- or 2,2-propylene or 2-methyl-1,2-propylene, but also, for example, 1,1-, 1,2- or 1,3-butylene, -pentylene-, -hexylene or -heptylene.

The lower alkylidene or alkylidyne radical $A_2$ preferably represents methylene, methylidyne, ethylidene or ethylidyne, but also, for example, propylidene, propylidyne, n- or i-butylidene, or -butylidyne.

The amino group Y is a primary, secondary or preferably a tertiary amino group, such as amino, mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; free, etherified or esterified hydroxylower alkylamino, N - (hydroxylower alkyl)-N-lower alkylamino or di-(hydroxylower alkyl)-amino, e.g. 2-hydroxyethylamino, 3 - hydroxypropylamino, N-(2-hydroxyethyl) - N - methylamino or di-(2-hydroxyethyl)-amino; monocyclic 3 to 7 ring-membered cycloalkylamino, cycloalkyl-lower alkylamino, N-cycloalkyl-N-lower alkylamino or N-cycloalkyl-lower alkyl-N-lower alkylamino, e.g. cyclopropylamino, cyclopentylamino, cyclohexylamino, cyclopropylmethylamino, 2-cyclopentylethylamino, N-cyclopentyl-N-methylamino, N-cyclohexyl - N - methylamino, N-cyclohexyl-N-ethylamino, N-cyclopentylmethyl-yl-N-ethylamino or N-(2-cyclopentylethyl) - N - methylamino, Ar-lower alkylamino or N-lower alkyl-N-Ar-lower alkylamino, e.g. benzylamino, 1- or 2-phenethylamino, N-methyl-N-benzylamino, N-ethyl-N-benzylamino or N-ethyl-N-(1- or 2-phenethyl)-amino; lower alkyleneimino or free, etherified or esterified hydroxy-alkyleneimino, e.g. ethyleneimino, pyrrolidino, 2-methyl-pyrrolidino, piperidino, 2- or 4-methyl-piperidino, 3- or 4-hydroxy-piperidino, 3-hydroxymethyl-piperidino, 4-(2 - hydroxyethyl)-piperidino, 1,6- or 2,5-hexamethyleneimino, 1,7- or 2,6-heptamethyleneimino, monooxa- or thia-lower alkyleneimino, e.g. morpholino, 3-methyl-morpholino or thiamorpholino, mono-aza-lower alkyleneimino, N-lower alkyl-N-Ar-lower alkyl- or N-Ar- or free, etherified or esterified N-(hydroxylower alkyl)-monoaza - lower alkyleneimino, e.g. piperazino, 4-(methyl, ethyl, n-propyl, -ipropyl, benzyl, phenyl, 2-hydroxyethyl- or 3-hydroxypropyl)-piperazino, 3-(methyl, ethyl or n-propyl)-3-aza-1,5- or 1,6-hexyleneimino or 4-methyl-4-aza-1,7- or 2,6-heptyleneimino. In the above amino groups two heteroatoms are separated by at least 2 carbon atoms, the etherified hydroxyalkyl groups mentioned are preferably lower alkoxy - alkyl groups, e.g. 2-methoxy- or 2-ethoxy-ethyl, 2- or 3-methoxy-propyl, and said esterified hydroxyalkyl groups are preferably lower alkanoyloxy- or Ar-lower alkanoyloxy-alkyl groups, e.g. 2-(acetoxy, propionyloxy, pivaloyloxy, benzoyloxy or phenylacetoxy)-ethyl or -propyl.

Acyl derivatives of the compounds of Formula I in which $R_1$ is hydrogen, X is hydrogen and hydroxy and/or Y is primary or secondary amino, are preferably those derived from lower alkanoic, lower alkenoic, Ar-lower alkanoic or Ar-lower alkenoic acids, such as the acetyl, propionyl, butyryl or pivalyl; benzoyl, phenylacetyl or cinnamoyl derivatives.

Quaternaries are preferably lower alkyl- or Ar-lower alkylammonium salts, such as halides, sulfates or sulfonates, e.g. methyl-, ethyl- or benzylammonium chlorides, bromides, iodides, methyl- or ethylsulfates, methane, ethane or p-toluene sulfonates.

The compounds of the invention exhibit valuable pharmacological properties. Apart from analgesic and tranquilizing effects, they exhibit primarily antiarrhythmic and antiinflammatory activity, as can be demonstrated in animal tests, using advantageously mammals, e.g. mice, rats or cats, as test objects. They can be applied enterally or parenterally, e.g. in the form of aqueous solutions or suspensions, in the dosage range between about 1 and 300 mg./kg./day, preferably between about 2 and 200 mg./kg./day, advantageously between about 5 and 50 mg./kg./day. The analgesic and tranquilizing effects can be estimated in the mice-tail flick or jiggle cage test system respectively. In the former, a radiant heat stimulus is applied to the tail of male mice and the duration of exposure is measured. The end-point is the time at which the animal moves its tail away from the stimulus, which never is applied longer than 10 seconds. Hereupon the compounds of the invention are applied subcutaneously, and 15, 30 and/or 60 minutes thereafter two post-drug time values are obtained. To determine the presence of an analgesic effect, the control means is determined and 3 standard deviations are added; any value above said sum is considered a reactor value, i.e. such indicating analgesia. In the jiggle cage test, the spontaneous movements of mice are recorded, and any depression of their motor activity indicates tranquilizing effects.

The antiarrhythmic effects can be estimated as follows: The compounds of the invention are administered orally (by capsule) to cats, preferably at a dosage between about 5 and 25 mg./kg./day. Three hours thereafter they are sacrificed, the hearts quickly removed and perfused with physiological saline containing 0.022 γ/ml. aconitine nitrate, until the onset of ventricular fibrillation. The efficacy of the drug is expressed by the duration of the protective effect (up to 1 hour). The antiinflammatory effects can be determined in the rat paw edema test system [Winter et al., Proc. Soc. Exp. Biol. & Med. 111, 544 (1962)], wherein the compounds are applied by stomach tube to male and female animals and about 1 hour later an aqueous suspension of carrageenin is injected into the rat's paw and any antiinflammatory activity can be expressed by the reduction of the volume and/or weight of the edematous paw, as compared with the edematous paw volume or weight of untreated or placebo (saline) treated animals. Besides their above-mentioned utility, the compounds of this invention are also useful intermediates in the manufacture of other valuable, e.g. pharmacologically active, products.

Particularly useful are compounds of Formulae I and II, in which each of $R_1$ and $R_2$ is hydrogen, lower alkyl, Ar-lower alkyl or Ar, wherein Ar is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl, $A_1$ is lower alkylene separating the adjacent carbon atoms by 1–3 carbon atoms, $A_2$ is lower alkylidene or alkylidyne, X represents 2 hydrogens, hydrogen and hydroxy or oxo, and Y is amino, lower alkylamino, di-lower alkylamino, hydroxy-lower alkylamino, N-(hydroxy-lower alkyl)-N-lower alkylamino, di-(hydroxy-lower alkyl)-amino, 3 to 7 ring-membered cycloalkylamino, cycloalkyl-lower alkylamino, N-cycloalkyl-N-lower alkylamino, N-cycloalkyl-lower akyl-N-lower alkylamino, Ar-lower alkylamino, N-lower alkyl-N-Ar-lower alkylamino, lower alkyleneimino, hydroxy-lower alkyleneimino, monooxa-, monothia- or monoazalower alkyleneimino, N-lower alkyl-monoaza-lower alkyleneimino, N-Ar-lower alkyl-monoaza-lower alkyleneimino, N-Ar-monoaza-lower alkyleneimino or N-(hydroxy-lower alkyl)-monoaza-lower alkyleneimino, wherein the heteroatoms are separated by at least 2 carbon atoms, lower alkanoyl, lower alkenoyl, Ar-lower alkanoyl or Ar-lower alkenoyl derivatives of the compounds in which $R_1$ is hydrogen, X is hydrogen and hydroxy or Y is primary or secondary amino, quaternaries and acid addition salts thereof.

Preferred are the compound of Formula III

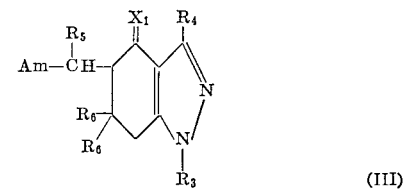

(III)

in which $R_3$ is lower alkyl, Ar-lower alkyl or Ar, $R_4$ is lower alkyl, $X_1$ is hydrogen and hydroxy or oxo, each of $R_5$ and $R_6$ is hydrogen or methyl and Am is di-lower alkylamino, lower alkyleneimino, hydroxy-lower alkyleneimino, monooxa-, monothia- or monoazalower alkyleneimino or N-lower alkyl- monoaza-lower alkyleneimino, N-Ar-lower-alkyl-monoaza-lower alkyleneimino or N-(hydroxy-lower alkyl)-monoaza-lower alkyleneimino, wherein the heteroatoms are separated by at least 2 carbon atoms, and Ar has the above-given meaning, and therapeutically useful acid addition salts thereof.

Especially valuable are the compounds of Formula III wherein $R_3$ is methyl, benzyl, phenyl or 4-fluorophenyl, $R_4$ is methyl or ethyl, $X_1$ is hydrogen and hydroxy or oxo, $R_5$ is hydrogen, $R_6$ is hydrogen or methyl and Am is pyrrolidino, piperidino, 4 - (2-hydroxyethyl)-piperidino, morpholino, 4-methyl-piperazino, 4-benzyl-piperazino, 4-(2-hydroxyethyl)-piperazino or 4 - (3 - hydroxypropyl)-piperazino, and therapeutically useful acid addition salts thereof.

The compounds of the invention are prepared according to methods in themselves known. Advantageously they are obtained by reacting compounds of the formulae

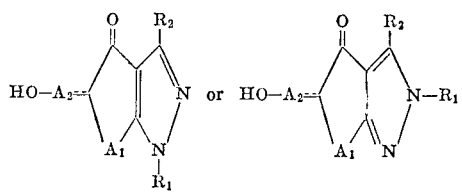

or reactive functional derivatives thereof, with the compound H—Y or a reactive salt thereof and, if desired, converting any resulting compound into another compound of the invention.

A reactive functional derivative of the starting material is, for example, a reactive ester of the alcohol used, derived, for example, from hydrohalic, sulfuric or sulfonic acids, e.g. hydrochloric, hydrobromic, hydriodic or sulfuric acid, methane, ethane, benzene or p-toluene sulfonic acid. A reactive salt of the ammonia or amine H—Y is advantageously derived from alkali or alkaline earth metals, e.g. sodium, potassium or magnesium.

The compounds of the invention so obtained may be converted into each other according to known methods. For example, resulting compounds in which $A_2$ is alkylidyne or X oxo, may be reduced according to conventional methods, e.g. with the use of catalytically activated or nascent hydrogen, e.g. hydrogen in the presence of platinum or palladium catalysts, or with reducing agents, such as simple or complex light metal hydrides, e.g. boron hydride or lithium aluminum hydride. Resulting compounds in which $R_1$ is hydrogen or Y a primary or secondary amino group, may be reacted with a reactive ester of a corresponding alcohol, e.g. alkanol, aralkanol or alkanediol, or may be acylated, for example, with a reactive functional derivative of a corresponding acid, such as a halide or anhydride thereof, or resulting acyl derivatives may be hydrolyzed, for example, with the use of acidic or alkaline hydrolyzing agents. Resulting esters may be hydrolyzed or transesterified or resulting alcohols esterified. Resulting tertiary amines may be quaternized in the usual manner, for example with the use of reactive esters of alcohols, preferably of lower alkanols, but also of aralkanols.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicyclic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the starting alcohols may be formed in the course of a Mannich reaction, i.e. in the reaction of a corresponding 5-unsubstituted 4-oxocycloalkano[c]pyrazole with an alkanal or alkanone and a secondary amine. Furthermore, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, said 5-unsubstituted 4-oxo-cycloalkano[c]pyrazoles are obtained by condensation of 2-$R_2$-carbonyl-cycloalklane-1,3-diones with $R_1$-hydrazines, metallizing the resulting 1- or 2-$R_1$-3-$R_2$-4-oxo-cycloalkano[c]pyrazoles in 5-position, e.g. with the use of an alkali metal or its hydride, and reacting the salt obtained with a lower alkanoic acid ester to yield the corresponding 5-hydroxyalkylidyne compounds. These can be converted into the corresponding 5-hydroxyalkylidene compounds, e.g. with the above-mentioned reduction means and the alcohols obtained reactively esterified, e.g. with the use of thionyl, sulfuryl, phosphorus or sulfonyl halides.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degree centigrade, and all parts whenever given are parts by weight.

EXAMPLE 1

The mixture of 9.3 g. 5-hydroxymethylene-1,3-dimethyl-4-oxo-4,5,6,7-tetrahydro-indazole, 75 ml. dry benzene and 4.3 ml. morpholine is refluxed on a water trap until 0.9 ml. water have been collected (2 to 3 hours). It is evaporated in vacuo, the residue triturated with diethyl ether to remove excess morpholine and recrystallized from benzene, to yield the 5-morpholinomethylene-1,3-dimethyl-4-oxo-4,5,6,7-tetrahydro-indazole of the formula

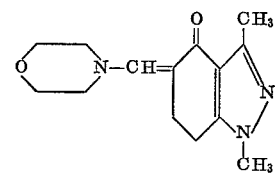

melting at 179–182°.

The starting material is prepared as follows: To the solution of 46.2 g. 2-acetyl-cyclohexane-1,3-dione in 500 ml. anhydrous ethanol, 13.8 g. methyl-hydrazine are added during 15 minutes while stirring and cooling in an ice bath. The mixture is allowed to warm up to room temperature, refluxed for 4 hours and evaporated in vacuo. The residue is taken up in methylene chloride, the solution washed with 5% aqueous sodium hydroxide, dried and evaporated. The residue is recrystallized from diethyl ether-hexane, to yield the 1,3-dimethyl-4-oxo-4,5,6,7-tetrahydro-indazole melting at 83–87°. The mother liquor is evaporated to yield a minor amount of the oily 2,3-dimethyl-4-oxo-4,5,6,7-tetrahydro-indazole.

To the mixture of 350 ml. dry benzene and 16.48 g. 59% sodium hydride in mineral oil, 33.22 g. 1,3-dimethyl-4-oxo-4,5,6,7-tetrahydro-indazole are added while stirring and cooling in an ice bath. Hereupon 49.5 ml. ethyl formate are added during 20 minutes, and the whole is stirred overnight at room temperature. To the heavy gel formed, 150 ml. water are added, the aqueous layer separated, washed with diethyl ether, acidified with 5% hydrochloric acid and extracted with methylene chloride. The extract is evaporated and the residue recrystallized from methylene chloride-hexane, to yield the 5-hydroxymethylene - 1,3 - dimethyl - 4 - oxo - 4,5,6,7 - tetrahydroindazole melting at 119–122°.

EXAMPLE 2

The mixture of 2.61 g. 5-morpholinomethylene-1,3-dimethyl-4-oxo-4,5,6,7-tetrahydro-indazole, 50 ml. glacial acetic acid and 0.26 g. pre-reduced platinum oxide is hydrogenated at room temperature until 218 ml. hydrogen have been consumed (about 3 hours). The mixture is filtered, the filtrate evaporated in the vacuum of a water jet pump, the residue taken up in methylene chloride and the solution extracted with 5% hydrochloric acid. The aqueous layer is made basic with sodium carbonate and saturated with ammonium sulfate. It is extracted with methylene chloride, the extract dried, evaporated and the residue recrystallized from diethyl ether-hexane, to yield the 5-morpholinomethyl-1,3-dimethyl-4-oxo-4,5,6,7-tetrahydro-indazole of the formula

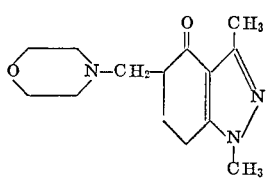

melting at 88–89°.

EXAMPLE 3

The mixture of 2.12 g. 1,3-dimethyl-4-oxo-4,5,6,7-tetrahydro-indazole, 35 ml. anhydrous ethanol, 1.11 g. piperidine, 1.12 ml. concentrated hydrochloric acid and 0.6 g. paraformaldehyde is refluxed for 24 hours. Hereupon another 0.2 g. paraformaldehyde are added and the mixture refluxed 48 hours. It is evaporated in vacuo, the residue taken up in water, the solution washed with methylene chloride made basic with sodium carbonate and extracted with methylene chloride. The extract is dried, evaporated and the residue recrystallized from diethyl ether-hexane, to yield the 5-piperidinomethyl-1,3-dimethyl-4-oxo-4,5,6,7-tetrahydro-indazole of the formula

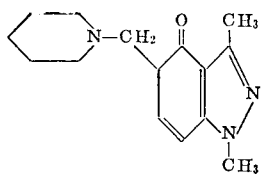

melting at 84–86°.

EXAMPLE 4

The mixture of 9.3 g. 5-hydroxymethylene-1,3-dimethyl-4-oxo-4,5,6,7-tetrahydro-indazole, 4.95 g. 1-methyl-piperazine and 75 ml. benzene is refluxed on a water trap until about 0.9 ml. water have been collected (about 2½ hours). It is evaporated in vacuo, the residue triturated with cold diethyl ether and 12.42 g. thereof are dissolved in the minimum amount of glacial acetic acid. The solution is hydrogenated over 1.24 g. pre-reduced platinum oxide until about 1.23 liter hydrogen has been absorbed. The mixture is filtered, the filtrate evaporated in vacuo, the residue dissolved in methylene chloride and the solution extracted with 5% hydrochloric acid. The extract is treated with charcoal, filtered, the filtrate neutralized with sodium carbonate and made basic with 10% aqueous sodium hydroxide. It is extracted with methylene chloride, the extract dried and evaporated. The residue is taken up in diethyl ether, filtered through a short column of magnesia-silica gel (15.5% MgO, 84% SiO₂ and 0.5% Na₂SO₄) and the filtrate recrystallized from diethyl ether-hexane, to yield the 5-(4-methyl-piperazino-methyl)-1,3-dimethyl-4-oxo-1,2,3,4-tetrahydro-indazole of the formula

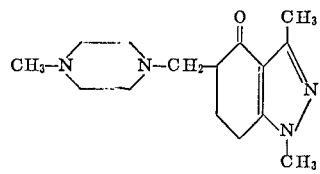

melting at 80–82°.

EXAMPLE 5

The mixture of 7.6 g. 5-hydroxymethylene-1,3-dimethyl-4-oxo-4,5,6,7-tetrahydro-indazole, 5.16 g. 4-(2-hydroxyethyl)-piperidine and 150 ml. benzene is refluxed on a water trap for 1 hours. It is cooled, stirred with charcoal, the mixture filtered and the filtrate evaporated. The residue is taken up in 50 ml. glacial acetic acid and the mixture hydrogenated at room temperature over 0.6 g. pre-reduced platinum oxide until the hydrogen uptake has ceased. The mixture is filtered, the filtrate evaporated in vacuo, the residue taken up in methylene chloride and the solution extracted with 5% hydrochloric acid. The aqueous layer is made basic with sodium carbonate, saturated with ammonium sulfate and extracted with methylene chloride. The extract is shaken with charcoal, filtered through magnesia-silica gel and recrystallized from methylene chloride-diethyl ether to yield the 5-[4-(2-hydroxyethyl) - piperidinomethyl]-1,3-dimethyl-4-oxo-4,5,6,7-tetrahydro-indazole of the formula

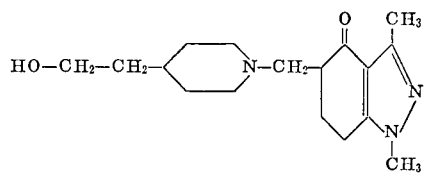

melting at 141–144°.

EXAMPLE 6

The mixture of 5.36 g. 5-hydroxymethylene-1-benzyl-3-methyl-4-oxo-4,5,6,7-tetrahydro-indazole, 1.83 ml. morpholine and 75 ml. benzene is refluxed on a water trap until 0.3 ml. water have been collected. It is evaporated in vacuo, the residue is taken up in 40 ml. glacial acetic acid and the mixture hydrogenated at room temperature over 0.5 g. pre-reduced platinum oxide until 550 ml. hydrogen have been absorbed. The mixture is filtered, the filtrate evaporated in vacuo and the residue taken up in methylene chloride. The solution is extracted with 5% hydrochloric acid, the aqueous layer made basic with sodium carbonate, extracted with methylene chloride, the extract dried and evaporated. The residue is taken up in dry benzene, the solution gassed with hydrogen chloride and the precipitate formed filtered off, to yield the 5-morpholino-methyl-1-benzyl - 3 - methyl-4-oxo-4,5,6,7-tetrahydro-indazole hydrochloride of the formula

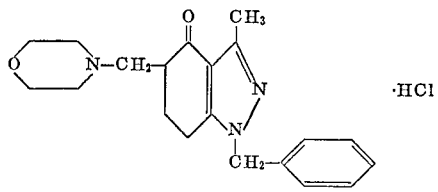

melting at 190;195°.

The starting material is prepared as follows: To the mixture of 30.8 g. 2-acetyl-cyclohexane-1,3-dione, 39 g. benzylhydrazine dihydrochloride and 300 ml. ethanol, 62.5 ml. triethylamine are added while cooling and the mixture refluxed for 4 hours. It is evaporated in vacuo, the residue taken up in methylene chloride, the solution washed with 5% hydrochloric acid and 5% aqueous sodium hydroxide, dried and evaporated. The residue is recrystallized from methylene chloride-diethyl ether, to yield the 1-benzyl-3-methyl-4-oxo - 4,5,6,7 - tetrahydroindazole melting at 74°. A small amount of the 2-benzyl-3-methyl-4-oxo-4,5,6,7-tetrahydro-indazole is isolated from the mother liquor boiling at 184–186°/0.6 mm. Hg.

To the suspension of 8.1 g. 59% sodium hydride in 400 ml. dry benzene, 2.4 g. 1-benzyl-3-methyl-4-oxo-4,5,6,7-tetrahydro-indazole are added, followed by 22.2 g. ethyl formate, and the mixture is stirred overnight at room temperature. Hereupon 100 ml. water are added, the aqueous phase separated, washed with diethyl ether and acidified with 5% hydrochloric acid. The mixture is extracted with methylene chloride, the extract dried, evaporated and the residue recrystallized from diethyl ether (with the use of a Soxhlet), to yield the 5-hydroxymethylene-1-benzyl-3-methyl-4-oxo-4,5,6,7-tetrahydro-indazole, melting at 202–204°.

EXAMPLE 7

The mixture of 8.04 g. 5-hydroxymethylene-1-benzyl-3-methyl-4-oxo-4,5,6,7-tetrahydro-indazole, 3.91 g. 1-(2-hydroxyethyl)-piperazine and 50 ml. benzene is refluxed on a water trap until 0.5 ml. water have been collected. It is evaporated in vacuo, the residue dissolved in 75 ml. glacial acetic acid and the solution hydrogenated over 0.8 g. pre-reduced platinum oxide until 830 ml. hydrogen have been absorbed. The mixture is filtered, the filtrate evaporated in vacuo, the residue taken up in methylene chlorid and extracted with 5% hydrochloric acid. The aqueous solution is made basic with sodium carbonate, extracted with methylene chloride, the extract dried and evaporated. The residue is taken up in benzene, the solution gassed with hydrogen chloride and the precipitate formed filtered off. It is dissolved in water, the solution washed with diethyl ether and made basic with 5% aqueous sodium hydroxide. The mixture is extracted with methylene chloride, the extract dried and evaporated. The residue is taken up in 100 ml. diethyl ether, the solution filtered, the filtrate gassed with hydrogen chloride and evaporated. The residue is suspended in toluene and the suspension evaporated in vacuo, to yield the very hygroscopic 5-[4-(2-hydroxyethyl)-piperazinomethyl]-1-benzyl-3-methyl-4-oxo-4,5,6,7-tetrahydro-indazole hydrochloride of the formula

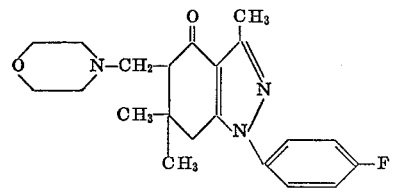

melting at 155–160°.

EXAMPLE 8

The mixture of 7.2 g. 1-benzyl-3-methyl-4-oxo-4,5,6,7-tetrahydro-indazole, 50 ml. ethanol, 3.87 g. 4-(2-hydroxyethyl)-piperidine, 2.58 ml. concentrated hydrochloric acid and 1.35 g. paraformaldehyde is refluxed overnight while stirring. Hereupon 0.45 g. paraformaldehyde are added and the mixture refluxed for two days. It is evaporated, the residue taken up in diethyl ether and the solution extracted with 5% hydrochloric acid. The acidic solution is made basic with aqueous ammonia, extracted with methylene chloride, the extract dried and evaporated. The residue is taken up in diethyl ether, the solution gassed with hydrogen chloride and the precipitate formed filtered off, to yield the very hygroscopic 5-[4-(2-hydroxyethyl)-piperidinomethyl]-1-benzyl-3-methyl-4-oxo-4,5,6,7-tetrahydro-indazole hydrochloride of the formula

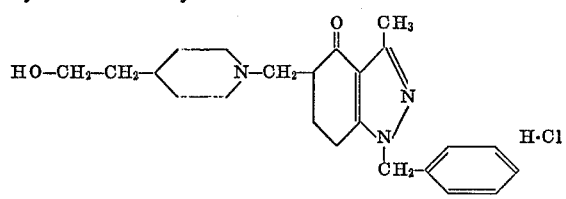

melting at about 100°.

EXAMPLE 9

The mixture of 9 g. 5-hydroxymethylene-1-(4-fluorophenyl)-3,6,6-trimethyl-4-oxo-4,5,6,7-tetrahydro-indazole, 2.74 ml. morpholine and 75 ml. benzene is refluxed on a water trap until 0.4 ml. water have been collected (overnight). It is evaporated in vacuo, the residue triturated with diethyl ether and 11.1 g. thereof are hydrogenated in 50 ml. glacial acetic acid over 0.9 g. pre-reduced platinum oxide until 825 ml. hydrogen have been absorbed. The mixture is filtered, the filtrate evaporated in vacuo, and the residue taken up in methylene chloride. The solution is washed with 5% aqueous sodium carbonate and 5% aqueous sodium hydroxide, dried and evaporated. The residue is taken up in 5% hydrochloric acid the solution washed with methylene chloride, made basic with 5% aqueous sodium carbonate and extracted with methylene chloride. The extract is dried, evaporated and the residue recrystallized from diethyl ether-hexane to yield the 5-morpholinomethyl-1-(4-fluorophenyl)-3,6,6-trimethyl-4-oxo-4,5,6,7-tetrahydro-indazole of the formula

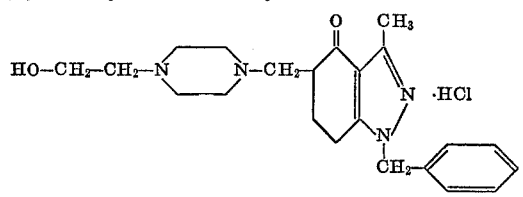

melting at 143–144°.

The starting material is prepared as follows: The saturated aqueous solution of 34.1 g. 4-fluorophenyl-hydrazine hydrochloride is made basic with 5% aqueous sodium hydroxide, extracted with methylene chloride, the extract dried and evaporated. The residue is taken up in 300 ml. ethanol, the solution combined with 36.4 g. 2-acethyl-5,5-dimethyl-cyclohexane-1,3-dione, refluxed for 6 hours and stirred overnight. It is evaporated in vacuo, the residue taken up in methylene chloride, the solution washed with 5% aqueous sodium hydroxide, dried, evaporated and the residue recrystallized from ethylene chloride-hexane, to yield the 1-(4-fluorophneyl)-3,6,6-trimethyl-4-oxo-4,5,6,7-tetrahydro-indazole melting at 107–111°.

43.75 g. thereof are added to the mixture of 13 g. 59% sodium hydride, 400 ml. dry benzene and 0.46 ml. ethanol, followed by the dropwise addition of 39.2 ml. ethyl formate. The mixture is stirred for 3½ hours and allowed to stand overnight at room temperature. It is combined with about half the volume of water and filtered. The residue is dissolved in the minimum amount of methanol, the solution acidified with 5% hydrochloric acid, extracted with methylene chloride, the extract dried, evaporated and the residue recrystallized from methylene chloride-benzene to yield the 5-hydroxymethylene-1-(4-fluorophenyl)-3,6,6-trimethyl-4-oxo-4,5,6,7-tetrahydro-indazole melting at 155–157°.

EXAMPLE 10

The mixture of 9.0 g. 5-hydroxymethylene-1-(4-fluorophenyl)-3,6,6-trimethyl-4-oxo-4,5,6,7-tetrahydro-indazole, 2.62 ml. pyrrolidine and 100 ml. benzene is refluxed on a water trap until about 0.5 ml. water have been collected. It is evaporated in vacuo, the residue taken up in 50 ml. glacial acetic acid and hydrogenated at room temperature over 0.5 g. pre-reduced platinum oxide. After the consumption of 705 ml. hydrogen, the mixture is filtered, the filtrate evaporated under reduced pressure, the residue dissolved in methylene chloride and the solution extracted with 5% hydrochloric acid. The aqueous phase is made basic with sodium carbonate, saturated with ammonium sulfate and extracted with methylene chloride. The extract is dried, evaporated and the residue recrystallized from diethyl ether-hexane, to yield the 5-pyrrolidinomethyl-1-(4-fluorophenyl)-3,6,6-trimethyl-4-oxo-4,5,6,7-tetrahydro-indazole of the formula

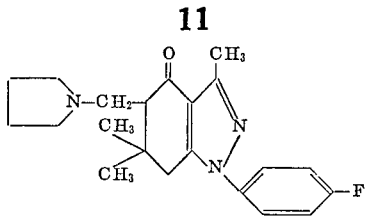

melting at 110–112°.

EXAMPLE 11

The solution of 3.9 g. 5-pyrrolidinomethyl-1-(4-fluorophenyl)-3,6,6-trimethyl - 4 - oxo - 4,5,6,7 - tetrahydroindazole in 20 ml. tetrahydrofuran is added dropwise to the mixture of 27.5 ml. N boron hydride in tetrahydrofuran and 20 ml. tetrahydrofuran at 5° while stirring and keeping the mixture under nitrogen. It is warmed up to room temperature, refluxed for 3 hours and allowed to stand at room temperature overnight. Hereupon 5 ml. 50% hydrochloric acid are added while cooling, the mixture filtered and the residue washed with diethyl ether and 5% hydrochloric acid. The filtrate is evaporated, the residue taken up in water, the solution washed with methylene chloride, made basic with sodium carbonate, saturated with ammonium sulfate and extracted with methylene chloride. The extract is dried and evaporated, to yield the gummy 5-pyrrolidinomethyl-1-(4-fluorophenyl)-4-hydroxy - 3,6,6 - trimethyl - 4,5,6,7 - tetrahydroindazole of the formula

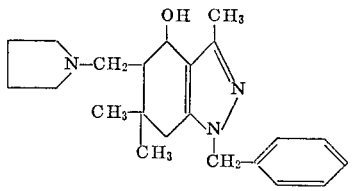

moving 11.5 cm. in the thin-layer chromatogram on silica gel, using benzene-hexane-diethylamine (4.5:4.5:1) as the mobile phase, whereas the starting material moves 9.0 cm.

EXAMPLE 12

The mixture of 3.81 g. 5-hydroxymethylene-1-phenyl-3-methyl-4-oxo-4,5,6,7-tetrahydro-indazole, 1.31 g. morpholine and 150 ml. benzene is refluxed for 8 hours on a water trap and allowed to stand overnight at room temperature. It is evaporated in vacuo, the residue triturated with diethyl ether and recrystallized from acetone, to yield the 5-morpholinomethylene - 1 - phenyl-3-methyl-4-oxo-4,5,6,7-tetrahydro-indazole of the formula

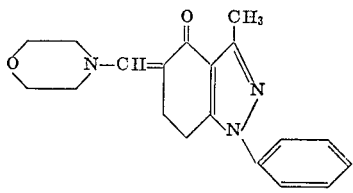

melting at 185–188°.

The starting material is prepared as follows: To the solution of 50 g. 2-acetyl-cyclohexane-1,3-dione in 1 liter anhydrous ethanol, 35 g. phenyl-hydrazine in 200 ml. ethanol are added while stirring and cooling, and the mixture is refluxed for 2 hours. It is evaporated in vacuo and the residue recrystallized from ethanol, to yield the 1-phenyl-3-methyl - 4 - oxo - 4,5,6,7 -tetrahydro-indazole melting at 126–129°.

The solution of 30 g. thereof in 300 ml. benzene is added dropwise to the mixture prepared from 17.3 g. sodium methoxide, 150 ml. benzene and 23.6 g. ethyl formate, while stirring under nitrogen, and the mixture is allowed to stand overnight at room temperature. Hereupon 1 liter water is added while stirring, the aqueous layer separated and the organic solution extracted with aqueous sodium hydroxide. The combined aqueous solutions are washed with water and poured over crushed ice and 300 ml. concentrated hydrochloric acid. The precipitate formed is filtered off, taken up in methylene chloride, the solution dried, evaporated and the residue recrystallized from diethyl ether, to yield the 5-hydroxymethylene-1-phenyl-3-methyl-4-oxo - 4,5,6,7 - tetrahydroindazole melting at 106–110°.

EXAMPLE 13

The mixture of 3.23 g. 5-morpholinomethylene-1-phenyl-3-methyl-4-oxo - 4,5,6,7 - tetrahydro-indazole, 250 ml. ethanol and 1 g. 10% pre-saturated palladium on charcoal is hydrogenated under normal conditions until the theoretical amount of hydrogen has been consumed. It is filtered, the filtrate evaporated in vacuo, the residue taken up in acetone and the solution acidified with isopropanolic hydrochloric acid. The precipitate formed is filtered off and recrystallized from isopropanol, to yield the 5 - morpholino-methyl-1-phenyl-3-methyl-4-oxo-4,5,6,7-tetrahydro-indazole hydrochloride of the formula

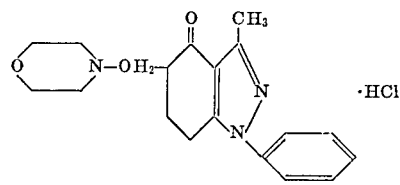

melting at 193–196°.

EXAMPLE 14

The mixture of 7.5 g. 5-hydroxymethylene-1-phenyl-3-methyl-4-oxo-4,5,6,7-tetrahydro-indazole, 200 ml. benzene and 2.95 g. 1-methyl-piperazine is refluxed for 8 hours on a water trap and allowed to stand overnight at room temperature. It is evaporated in vacuo, the residue recrystallized from acetone-heptane, to yield the 5-(4-methyl-piperazinomethylene) - 1 - phenyl-3-methyl-4-oxo-4,5,6,7-tetrahydro-indazole melting at 146–149°.

6 g. thereof are hydrogenated in 250 ml. ethanol over 1 g. pre-saturated palladium on charcoal until 415 ml. hydrogen have been absorbed. The mixture is filtered, the filtrate concentrated, the concentrate acidified with isopropanolic hydrochloric acid, the precipitate formed filtered off and recrystallized from ethanol, to yield the 5-(4 - methyl - piperazinomethyl)-1-phenyl-3-methyl-4-oxo-4,5,6,7-tetrahydro-indazole dihydrochloride of the formula

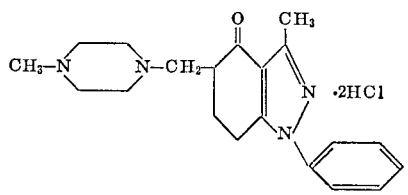

melting at 232–235°.

EXAMPLE 15

The mixture of 6.0 g. 5-hydroxymethylene-1-phenyl-3-methyl-4-oxo-4,5,6,7-tetrahydro-indazble, 3.07 g. 1-(2-hydroxyethyl)piperazine and 200 ml. benzene is refluxed for 8 hours at a water trap. It is evaporated in vacuo and the mixture recrystallized from benzene, to yield the 5-[4-(2 - hydroxyethyl)-piperazinomethylene] - 1 - phenyl-3-methyl-4-oxo - 4,5,6,7 - tetrahydro - indazole melting at 80–84°.

6 g. thereof are hydrogenated in 150 ml. ethanol over 1 g. pre-saturated platinum on charcoal until about 400 ml. hydrogen have been absorbed. It is filtered, the filtrate concentrated, the concentrate acidified with isopropanolic hydrochloric acid, the precipitate formed filtered off and recrystallized from methanol, to yield the 5-[4-(2-hydroxyethyl) - piperazinomethyl] - 1 - phenyl-3-methyl-4- oxo-4,5,6,7-tetrahydro-indazole dihydrochloride of the formula

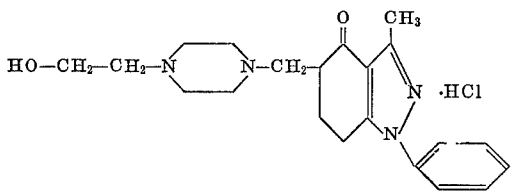

melting at 228–230°.

EXAMPLE 16

The mixture of 6.25 g. 5-hydroxymethylene-1-phenyl-3-methyl - 4 - oxo - 4,5,6,7 - tetrahydro-indazole, 4.31 g. 1-benzyl-piperazine and 20 ml. benzene is refluxed for 8 hours on a water trap and allowed to stand overnight at room temperature. It is evaporated in vacuo and the residue recrystallized from acetone, to yield the 5-(4-benzyl-piperazinomethylene)-1-phenyl-3-methyl - 4 - oxo-4,5,6,7-tetrahydro-indazole melting at 182–183°.

2 g. thereof are hydrogenated in 140 ml. ethanol over 0.4 g. pre-reduced platinum oxide until the theoretical amount of hydrogen has been absorbed. It is filtered, the filtrate concentrated, the concentrate acidified with isopropanolic hydrochloric acid, the precipitate formed filtered off and recrystallized from methanol with the aid of charcoal, to yield the 5-(4-benzyl-piperazinomethyl)-1-phenyl-3-methyl-4-oxo - 4,5,6,7-tetrahydro - indazole dihydrochloride of the formula

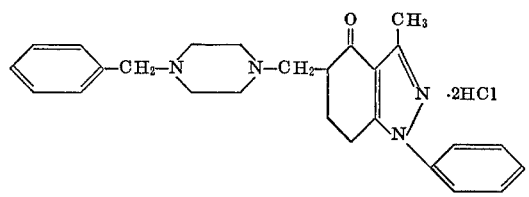

melting at 245–250°.

EXAMPLE 17

The mixture of 7.62 g. 1-benzyl-3-ethyl-4-oxo-4,5,6,7-tetrahydro-indazole, 2.61 ml. morpholine, 2.58 ml. concentrated hydrochloric acid, 75 ml. ethanol and 1.35 g. sym-trioxane is refluxed overnight. Refluxing is continued for a total of 42 hours during which time 0.45 g. sym-trioxane are added twice. The mixture is evaporated in vacuo, the residue taken up in diethyl ether, and the solution extracted with 5% hydrochloric acid. The acidic solution is made basic with aqueous ammonia, saturated with ammonium sulfate and extracted with methylene chloride. The extract is dried, evaporated and the residue taken up in methanol. The solution is diluted with water, the supernatant decanted off, the residue taken up in diethyl ether and the solution gassed with hydrogen chloride. The precipitate formed is filtered off, to yield the 5 - morpholinomethyl - 1 - benzyl-3-ethyl-4-oxo-4,5,6,7-tetrahydro-indazole hydrochloride of the formula

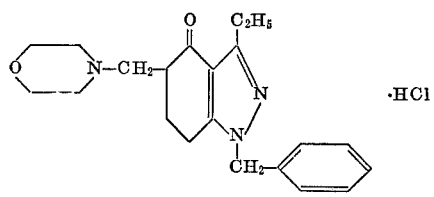

melting at 177–178°.

The starting material is prepared as follows: To the solution of 33.6 g. 2-propionyl-cyclohexane-1,3-dione in 300 ml. ethanol, 39 g. benzyl hydrazine dihydrochloride are added, followed by 55.5 ml. triethylamine while stirring, and the mixture is refluxed overnight. It is evaporated in vacuo, the residue taken up in diethyl ether and the solution washed with 5% hydrochloric acid and 5% aqueous sodium hydroxide, dried and evaporated. The residue is recrystallized from diethyl ether-hexane, to yield the 1-benzyl-3-ethyl-4-oxo-4,5,6,7-tetrahydro-indazole, melting at 78–81°. The mother liquor is evaporated to yield a minor amount of the oily 2-benzyl-3-ethyl-4-oxo-4,5,6,7-tetrahydro-indazole moving 7.0 cm. in the thin layer chromatogram on silica gel using chloroform-formic acid (9:1) as the mobile phase.

EXAMPLE 18

The mixture of 7.6 g. 1-benzyl-3-ethyl-4-oxo-4,5,6,7-tetrahydro-indazole, 2.58 ml. concentrated hydrochloric acid, 3.87 g. 4-(2-hydroxyethyl)-piperidine, 75 ml. ethanol and 1.35 g. sym-trioxane is refluxed for 2 hours. Hereupon another 0.9 g. trioxane are added and the mixture refluxed for 2 days. It is evaporated in vacuo, the residue taken up in 5% hydrochloric acid and the solution washed with diethyl ether. The aqueous phase is made basic with aqueous ammonia, extracted with methylene chloride, the extract dried and evaporated. The residue is taken up in diethyl ether, the solution gassed with hydrogen chloride and the precipitate formed filtered off, to yield the very hygroscopic 5-[4-(2-hydroxyethyl)-piperidinomethyl]-1-benzyl-3-ethyl-4-oxo-4,5,6,7 - tetrahydro-indazole hydrochloride of the formula

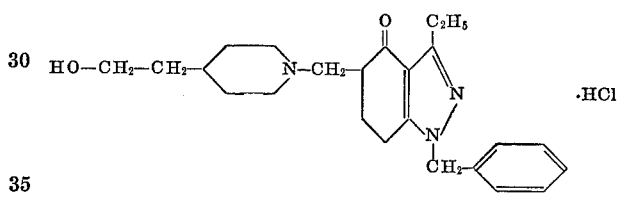

melting at about 105°.

EXAMPLE 19

The mixture of 7.62 g. 1-benzyl-3- ethyl-4-oxo-4,5,6,7-tetrahydro-indazole, 4.32 g. 1-(3-hydroxypropyl)-piperazine, 5.17 ml. concentrated hydrochloric acid, 50 ml. ethanol and 1.35 g. sym-trioxane is refluxed for 2 hours. It is cooled, another 2.16 g. 1-(3-hydroxypropyl)-piperazine, 2.6 ml. concentrated hydrochloric acid and 0.9 g. trioxane are added and the mixture refluxed overnight while stirring. Hereupon 0.9 g. trioxane are added twice, as well as 5 ml. water and refluxing is continued for a total of 48 hours. The mixture is evaporated in vacuo, the residue taken up in 1% hydrochloric acid, the solution washed with diethyl ether and the aqueous phase made basic with aqueous ammonia. It is extracted with methylene chloride, and extract dried, evaporated, the residue taken up in diethyl ether and the solution gassed with hydrogen chloride. The precipitate formed is filtered off, to yield the very hygroscopic 5-[4-(3-hydroxypropyl)-piperazinomethyl] - 1 - benzyl-3-ethyl-4-ozo-4,5,6,7-tetrahydro-indazole-dihydrochloride of the formula

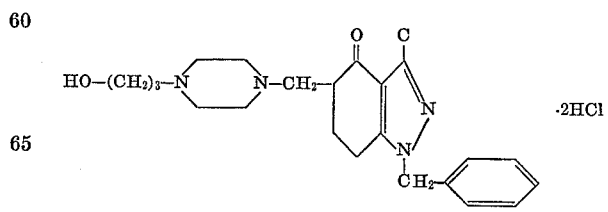

moving 3.5 cm. in the thin-layer chromatogram on silica gel using benzene-diethylamine (9:1) as the mobile phase.

In the analogous manner the 5-[4-(2-hydroxyethyl)-piperazino - methyl]-1-benzyl-3-ethyl-4-oxo-4,5,6,7-tetrahydro-indazole-dihydrochloride is prepared, melting at 108–109°.

EXAMPLE 20

Preparation of 10,000 tablets each containing 25 mg. of the active ingredient:

| Formula: | G. |
|---|---|
| 5 - morpholinomethyl-1-benzyl-3-methyl-4-oxo - 4,5,6,7-tetrahydro-indazole hydrochloride | 250.00 |
| Lactose | 1,956.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure.—All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

We claim:

1. An antiinflammatory composition comprising an effective amount of a tetrahydro-indazole of the formula

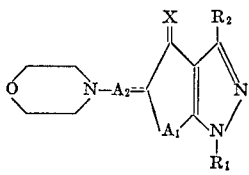

in which each of $R_1$ and $R_2$ is hydrogen, lower alkyl, Ar-lower alkyl or Ar, wherein Ar is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl, $A_1$ is lower alkylene separating the adjacent carbon atoms by 2 carbon atoms, $A_2$ is lower alkylidene or alkylidyne, and X represents hydrogen and hydroxy or oxo, lower alkanoyl, lower alkenoyl, Ar-lower alkanoyl or Ar-lower alkenoyl derivatives of the compounds in which $R_1$ is hydrogen or X is hydrogen and hydroxy, a thermapeutically useful acid addition salt thereof, together with a pharmaceutical excipient.

2. A composition as claimed in claim 1, in which formula of the tetrahydro-indazole $R_1$ is methyl, benzyl, phenyl or 4-fluorophenyl, $R_2$ is methyl or ethyl, X is hydrogen and hydroxy or oxo, $A_1$ is 1,2-ethylene or 2-methyl-1,2-propylene and $A_2$ is methylidene or ethylidene or a therapeutically useful acid addition salt thereof.

3. A composition as claimed in claim 1, wherein the tetrahydro-indazole is the 5-morpholinomethyl-1-benzyl-3-methyl-4-oxo-4,5,6,7-tetrahydroindazole or a therapeutically useful acid addition salt thereof.

4. A method of treating inflammation in a mammal comprising administering to said mammal an effective amount of a tetrahydro-indazole of the formulae

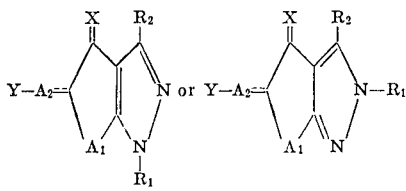

in which each of $R_1$ and $R_2$ is hydrogen, lower alkyl, Ar-lower alkyl or Ar, wherein Ar is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl, $A_1$ is lower alkylene separating the adjacent carobn atoms by 1–3 carbon atoms, $A_2$ is lower alkylidene or alkylidyne, X represents 2 hydrogens, hydrogen and hydroxy or oxo, and Y is amino, lower alkylamino, di-lower alkylamino, hydroxy-lower alkylamino, N-(hydroxy-lower alkyl)-N-lower alkylamino, di-(hydroxy-lower alkyl)-amino, 3 to 7 ring-membered cycloalkylamino, cycloalkyl-lower alkylamino, N-cycloalkyl-N-lower alkylamino, N-cycloalkyl-lower alkyl-N-lower alkylamino, Ar-lower alkylamino, N-lower alkyl-N-Ar-ower alkylamino, lower alkyleneimino, hydroxy-lower alkyleneimino, monooxa-, monothia- or monoazo-lower alkyleneimino, N-lower alkyl-monoazo-lower alkyleneimino, N-Ar-lower alkyl-monoazo-lower alkyleneimino, N-Ar-monoazo-lower alkyleneimino or N - (hydroxy-lower alkyl)-monoazo-lower alkyleneimino, wherein the heteroatoms are separated by at least 2 carbon atoms, lower alkanoyl, lower alkenoyl, Ar-lower alkanoyl or Ar-lower alkenoyl derivatives of the compounds in which $R_1$ is hydrogen, X is hydrogen and hydroxy or Y is primary or secondary amino, or a therapeutically useful acid addition salt thereof, together with a pharmaceutical excipient.

5. A method as claimed in claim 4, wherein the tetrahydro-indazole is that of the formula

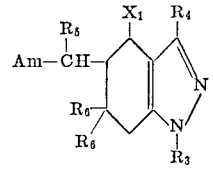

in which $R_3$ is lower alkyl, Ar-lower alkyl or Ar, wherein Ar is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl, $R_4$ is lower alkyl, $X_1$ is hydrogen and hydroxy or oxo, each of $R_5$ and $R_6$ is hydrogen or methyl and Am is di-lower alkylamino, lower alkyleneimino, hydroxy-lower alkyleneimino, morpholino, thiamorpholino, piperazino, N-lower alkyl-piperazino, N - Ar-lower-alkyl-piperazino or N-(hydroxy-lower alkyl)-piperazino, wherein the heteroatoms are separated by at least 2 carbon atoms, or a therapeutically useful acid addition salt thereof.

References Cited

UNITED STATES PATENTS 2,935,514   5/1960   Hoffman et al. __ 260—247.5 B

STANLEY J. FRIEDMAN, Primary Examiner

U.S. Cl. X.R.

260—247.5 B; 424—244, 246, 250, 263, 267, 273

PO-1050
(5/69)

UNITED STATES PATENT OFFICE
CERTIFICATE OF CORRECTION

Patent No. 3,657,438      Dated April 18, 1972

Inventor(s)    HERBERT MORTON BLATTER ET AL

It is certified that error appears in the above-identified patent and that said Letters Patent are hereby corrected as shown below:

Column 1, line 5, after "assignors to" should read

-- CIBA-GEIGY Corporation, Ardsley, New York --;

Column 15, line 53, delete "thermapeutically" and insert

-- therapeutically --;

Column 16, line 23, after "alkyl-N-Ar-" delete "ower"

and insert -- lower --.

Signed and sealed this 7th day of May 1974.

(SEAL)
Attest:

EDWARD M. FLETCHER, JR.
Attesting Officer

C. MARSHALL DANN
Commissioner of Patents